(12) United States Patent
Blank

(10) Patent No.: US 8,935,059 B2
(45) Date of Patent: Jan. 13, 2015

(54) SYSTEM FOR CONTROLLING A WORK MACHINE

(75) Inventor: Sebastian Blank, Kaiserslautern (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/809,630

(22) PCT Filed: Jun. 30, 2011

(86) PCT No.: PCT/EP2011/061064
§ 371 (c)(1),
(2), (4) Date: Jan. 11, 2013

(87) PCT Pub. No.: WO2012/007292
PCT Pub. Date: Jan. 19, 2012

(65) Prior Publication Data
US 2013/0116896 A1    May 9, 2013

(30) Foreign Application Priority Data
Jul. 14, 2010 (DE) .......................... 10 2010 031 344

(51) Int. Cl.
G06F 19/00 (2011.01)
A01B 79/00 (2006.01)
H04Q 9/00 (2006.01)

(52) U.S. Cl.
CPC .............. *G06F 19/00* (2013.01); *A01B 79/005* (2013.01); *H04Q 9/00* (2013.01); *H04Q 2209/20* (2013.01); *H04Q 2209/40* (2013.01)
USPC .......................................... 701/50; 701/30.3

(58) Field of Classification Search
CPC ............ B60C 23/005; B60C 23/0408; A01D 41/127; G07C 5/0825; H04B 7/155; F02D 41/083; A01B 79/005; H04Q 9/00; E01C 19/00; E02F 9/2025
USPC ............ 701/54; 340/438, 684, 447; 455/11.1; 73/53.01; 707/200
See application file for complete search history.

(56) References Cited

U.S. PATENT DOCUMENTS 4,296,409 A * 10/1981 Whitaker et al. ............. 340/684
6,668,157 B1 * 12/2003 Takeda et al. ................ 455/11.1
(Continued)

FOREIGN PATENT DOCUMENTS

DE    102005029405 A1    1/2007
EP         0192120 A2    8/1986
(Continued)

OTHER PUBLICATIONS

Hoseinnezhad et al., "Fusion of Redundant Information in Brake-By-Wire Systems Using a Fuzzy Voter," Journal of Advances in Information Fusion, vol. 1, No. 1, Jul. 2006, pp. 52-62.
(Continued)

*Primary Examiner* — Tuan C. To
*Assistant Examiner* — Yuri Kan
(74) *Attorney, Agent, or Firm* — Yee & Associates, P.C.

(57) ABSTRACT

A system and a method for controlling a work machine. A plurality of sensor arrangements provide a respective output value. A data transmission network connects the sensor arrangements to a processor unit. The processor unit is operated to convert output values from the sensor arrangement into a standard data format on the basis of formatting data associated with the sensor arrangements and to amalgamate them to form a combined measured value. It is proposed that the processor unit be able to operate to obtain the formatting data via the transmission network.

20 Claims, 3 Drawing Sheets

(56) References Cited

U.S. PATENT DOCUMENTS

| | | | |
|---|---|---|---|
| 7,581,434 B1* | 9/2009 | Discenzo et al. | 73/53.01 |
| 2002/0059320 A1* | 5/2002 | Tamaru | 707/200 |
| 2002/0084895 A1* | 7/2002 | Dixit et al. | 340/447 |
| 2002/0130771 A1* | 9/2002 | Osborne et al. | 340/438 |
| 2003/0109977 A1* | 6/2003 | Landes et al. | 701/54 |

FOREIGN PATENT DOCUMENTS

| | | |
|---|---|---|
| EP | 0316506 A1 | 5/1989 |
| EP | 1277388 A1 | 1/2003 |
| EP | 2020168 A1 | 2/2009 |
| EP | 2169499 A2 | 3/2010 |
| GB | 2447731 A | 9/2008 |
| WO | WO0113558 A1 | 2/2001 |

OTHER PUBLICATIONS

PCT International Preliminary Report on Patentability, PCT/EP2011/061064, Jan. 24, 2013, 8 pages.

PCT International Search Report, PCT/EP2011/061064, Oct. 21, 2011, 3 pages.

* cited by examiner

SYSTEM FOR CONTROLLING A WORK MACHINE

By definition, embedded systems for controlling work machines are such that they are incorporated to a high extent into their environment of use. This problem includes a central core aspect: The system must have available ways of acquiring the respective environmental parameters (status parameters) in order to start a desired reaction, as a countermeasure. For this purpose, sensor arrangements are used that measure a special parameter and directly or indirectly convert it into an electrically usable signal.

In order to be able to reasonably combine or compare the determined magnitudes, it is essential to convert them to a standard representation format. This is necessary because the sensor arrangements have different output variables, measurement units and scale formats. A good example of this is the speed of a vehicle. Said speed can be represented at the sensor output as a voltage, a resistance, a pulse per time unit or as a digital value. Moreover, depending on the sensor type and the manufacturer, various other measurement units or scales, for example, km/h, m/s, mph or the like or a static bias can be used. In addition, there may be various types of information representation (for example, amplitude or frequency modulation) are common.

Converting measured values of different sensors into a standard representation format is an absolute requirement in the context of sensor fusion approaches.

During the fusion, the output values from as many available sensors as possible, which represent the same physical parameter (ideally using different measurement principles), are mathematically combined in order to increase the precision and the reliability of the measurement above the level of capability of an individual sensor.

Achieving this in past systems required, for each sensor, that the knowledge on the information representation with the above-mentioned parameters be explicitly present locally in the system. As a rule, this means that, for the development phase, a fixed sensor configuration of the system is assumed, for which the required information is available beforehand in fixed form. A typical example of such a static process can be found, for example, in the publication HOSEINNEZHAD et al., "Fusion of Redundant Information in Brake-By-Wire Systems Using a Fuzzy Voter," JOURNAL OF ADVANCES IN INFORMATION FUSION, VOL. 1, NO. 1, JULY 2006. Other systems with fusion of sensor data in agricultural work machines with locally stored data on the information representation of the given sensors can be found in EP 2 020 168 A1 and EP 2 169 499 A2.

The decisive disadvantage of this approach is the inability to achieve a dynamic enlargement of the information sources over the operating time, because the knowledge required for that purpose is not available locally. Consequently, the sensors in question cannot be included in the decision process of the system, which in general results in low precision and reliability of the result.

This is a decisive disadvantage particularly in the field of agricultural utility vehicle technology, because, for example, information sources that are made available by a work or cultivation apparatus can usually not be used. In this special case, this is particularly disadvantageous, because the sensors are often tailored in a much more targeted manner to the concrete application case than the sensors available on board a tractor.

The problem that is the foundation of the invention is to avoid or reduce the mentioned disadvantages.

SUMMARY OF THE INVENTION

This problem is solved according to the invention by the teaching of Claims 1 and 10, wherein, in the additional claims, characteristics are indicated which further develop the solution in an advantageous manner. The invention relates to a system for controlling a work machine, comprising: a plurality of sensor arrangements, each of which provides an output value, a processor unit, and a data transmission network which connects the sensor arrangements to the processor unit, which can be operated to convert the output values from the sensor arrangements into a standard data format on the basis of formatting data associated with the sensor arrangements, and to amalgamate them to form a combined measured value.

The system and method presented below make it possible, particularly in an agricultural work machine, to carry out the adaptation of the available information of the sensor arrangement to a standard format for static as well as for dynamically changing sensor configurations of the system, without explicit local prior knowledge. The formatting data required for this purpose is obtained over the running time via a data transmission network, which connects the sensor arrangement to a processor unit which carries out the adaptation and the amalgamation of the measured values of the respective identical or different sensor arrangements. For this purpose, all that needs to be known is a system-wide unequivocal recognition characteristic, for example, an identification number of the sensor arrangement. The formatting data proper can be stored either locally or also in a decentralized manner in the data transmission network. Here, they are then available if needed, in order to convert sensor measured values transmitted via the data transmission network to a standard and comparable format.

Before the arriving raw data from the sensor arrangement can be processed, the formatting data that is needed to convert the values from the sensor arrangement into data that can be compared to the data from other sensor arrangements has to be made accessible to the system. For this purpose, at the start, or after the connection of a work apparatus to the work machine, an identification number can be transferred, a single time, from each sensor arrangement, which identification number which then makes it possible to unequivocally assign the sensor arrangement. On the basis of this identification number, the processor unit now can query whether local knowledge is present (i.e., the system already knows the sensor arrangement). Then, the formatting data can be called up, for example, from a storage unit of the sensor arrangement or from a separate storage unit. If this is not the case, then the corresponding data has to be procured in a decentralized manner, for example, via a wireless data transmission network which provides a connection to external computers. A suitable example is a data transmission network, since it allows connected systems and service providers of various types (for example, different agricultural machines, servers of service providers) to exchange data. Thus, if any participant (for example, another tractor or a server of the apparatus manufacturer) already has the required information, then said information can be made available to all the units connected to the data transmission network.

The provision of information occurs in an ordered form. The essential components of a data unit of the formatting data can be:

An identification number which allows unequivocal assignment to the corresponding sensor arrangement:

The physical parameter(s) which is (are) measured by the sensor arrangement (for example, temperature or mechanical forces)

Measurement unit, scaling factors, zero offset (bias) of the measured value

Indications on information coding

Dependencies on intrinsic parameters (for example, wheel parameter in a wheel rpm sensor for calculating the speed)

Additional optional information, for example, a quality metrics, a measurement range, etc.

For this purpose, data sets in the XML format are ideally suited, because they make it possible to store and exchange the required contents in a compact, structured, and easily accessible form. However, other data formats are also conceivable.

The presented approach makes it possible to adapt dynamically to new data acquisition sources (which are unknown to the local system). As a result, it becomes possible to make all the sensor arrangements that are available across the entire system available to the system. This is a decisive advantage, particularly in the field of agricultural machines, because this procedure allows, for example, by way of using the sensor system of the working apparatus, a higher precision in the acquisition of the physical measured parameters. Moreover, as a result it is also possible to reduce the number of the sensor arrangements in the total system (since sensors need to be present only once, instead of having to be a provided, for example, in duplicates in the tractor and in the work apparatus). As a result, a cost savings can be achieved. Other data combination approaches make it possible, on the basis of this enlarged data foundation, to reach conclusions regarding measured parameters that heretofore were not accessible. The formatting data can be stored in the factory, or they can be learned during the operation of the work machine in question or another work machine.

The combined measured value made available by the processor unit can be used in particular to control actuators of a work machine or of a work apparatus.

DRAWING

In the drawing, an embodiment example of the invention is represented, which is described in further detail below:

DETAILED DESCRIPTION OF PREFERRED EMBODIMENT

Figure 1:
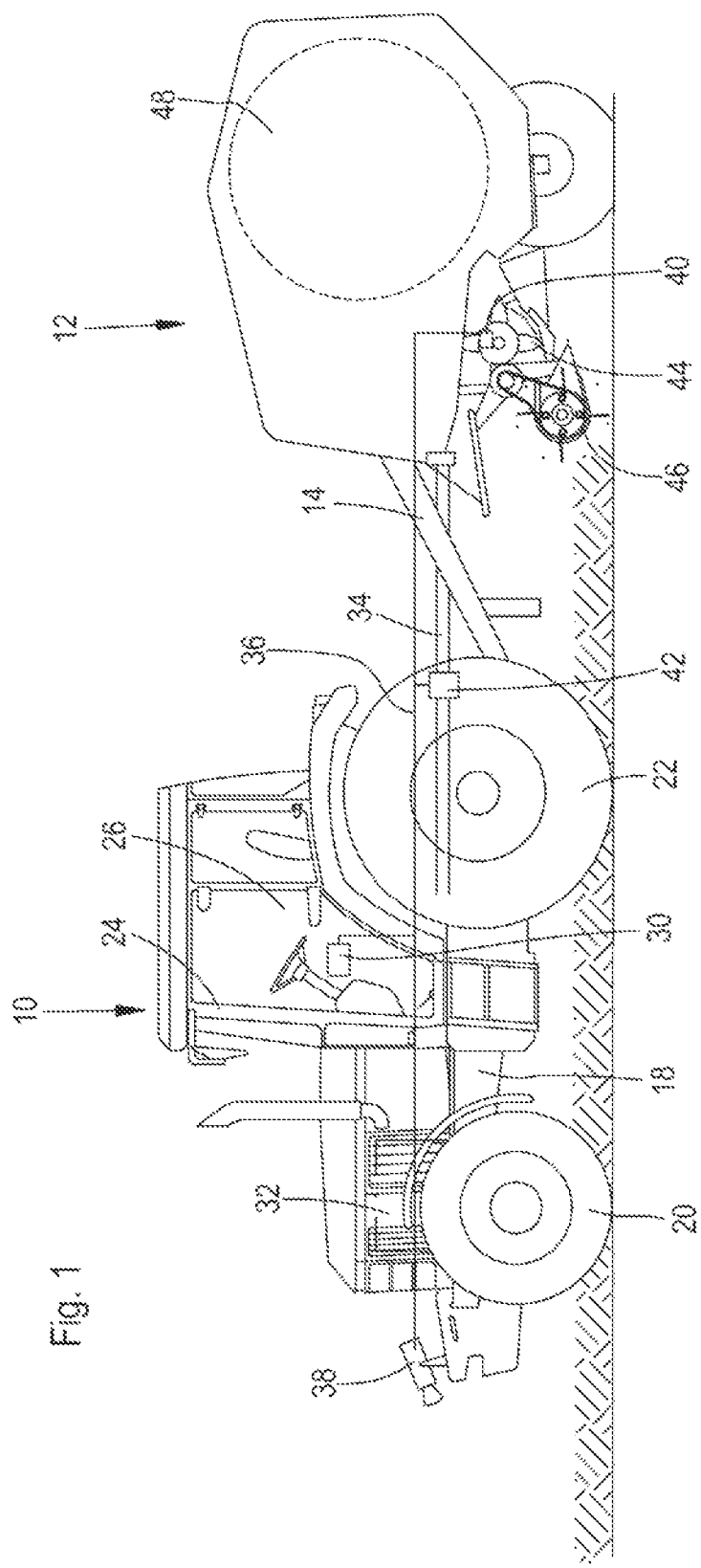
FIG. 1 shows a side view of an agricultural work machine with a work apparatus.

FIG. 1 shows a side view of an agricultural work machine 10 in the form of a tractor and of a work apparatus 12, which in itself is known (see EP 0 316 506 A1) and which is connected by a drawbar 14 to a trailer hitch (not shown) of the a work machine 10, said work apparatus being in the form of a round baler with constant or variable press chamber size. The work machine 10 is constructed on a supporting frame 18, which is braced on steerable front wheels 20 and drivable rear wheels 22, and which carries a cabin 24 in which an operator work place 26 is located.

The work machine 10 comprises a control unit 30, which is used for controlling the rate of advance of the work machine 10, and which controls the transmission ratio of a transmission (not shown) which is driven by a combustion engine 32, for driving the rear wheels 22. Here, the rpm of the combustion engine 32 and the rpm of a power-takeoff shaft 34, wherein the latter can be selected in increments, for driving the driven element of the work apparatus 12, remain at least approximately constant. For the construction and for the control of the driving of the work machine 10 and of the work apparatus 12, reference is made to the disclosure of DE 10 2005 029 405 A1, which is included by reference in the present documents.

The control unit 30 is connected via a data transmission network 36 in the form of a bus to different sensor arrangements 38, 40, 42. A first sensor arrangement 38 comprises a camera that looks on the swatch in front of the work machine 10, and an image processing system 52 that derives the cross-sectional volume of the swath from the image of the camera. A second sensor arrangement 40 is arranged on board the work apparatus 12, and it determines the driving torque of a rotor 44 which conveys harvested material downstream of a receiver 46 into a baling chamber 48. A third sensor arrangement 42 is located on board the work machine 10 and it determines the driving torque of the output shaft 34. The control unit 30, for its part, controls the rate of advance of the work machine 10 in such a manner that a desired, constant harvest material uptake rate of the work apparatus 12 is achieved automatically.

Figure 2:
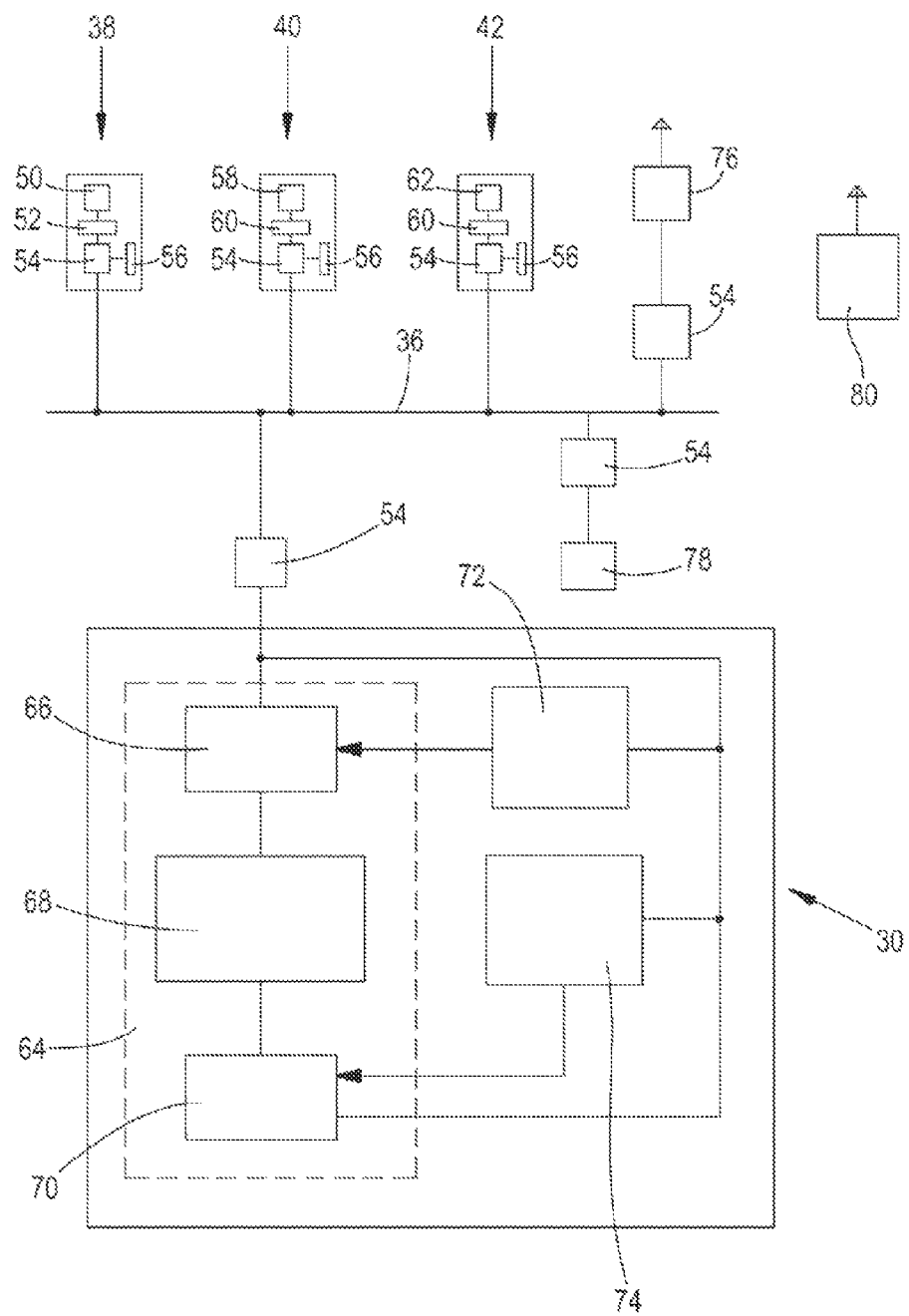
FIG. 2 shows a schematic diagram of a system according to the invention for controlling the work machine.

FIG. 2 shows the data transmission network 36, the sensor arrangements 38-42, and the control unit 30 in a schematic representation.

The first sensor arrangement 38 comprises an image sensor 50, the image processing system 52, a network interface 54, and a memory 56. The image receiver 50 delivers image data, from which the image processing system 52 derives the cross-sectional area of the swath, and transmits it via the network interface 54 and the data transmission network 36 to the control unit 30. In the memory 56, formatting data is stored, which contains the following information: (a) an identification number of the first sensor arrangement 38, (b) an indication that the first sensor arrangement 38 is determining the cross-sectional area of the swath in front of the work vehicle 10, (c) the measurement unit of the cross-sectional area (for example, $cm^2$), (d) indications showing how the information of the first sensor arrangement 38 is coded in the data, (e) indications showing at which site, that is, how far in front of the first sensor arrangement 38, the cross-sectional area is evaluated, and (f) indications on the precision of the determined cross-sectional area in the file.

The second sensor arrangement 40 comprises a strain gauge 58, an analog/digital converter 60, a network interface 54, and a memory 56. The strain gauge 58 delivers an electrical value (voltage, current or resistance) that the analog/digital converter 60 digitizes and transmits via the network interface 54 and the data transmission network 36 to the control unit 30. In the memory 56, formatting data is stored, which contains the following information: (a) an identification number of the second sensor arrangement 40, (b) an indication that the second sensor arrangement 40 is determining a torque of a rotor 44 of the work apparatus 12, (c) the measurement unit of the torque, (d) indications showing how the information of the second sensor arrangement 40 is coded in the data, (e) the relation between the torque and the feed rate (kg/s) of the harvested material into the work apparatus 12, and (f) indications regarding the precision of the determined torque.

The third sensor arrangement 42 comprises a strain gauge 62, an analog/digital converter 60, a network interface 54, and a memory 56. The strain gauge 62 delivers an electrical value (voltage, current or resistance) that the analog/digital converter 60 digitizes and transmits via the network interface 54 and the data transmission network 36 to the control unit 30. In the memory 56, formatting data is stored, which contains the following information: (a) an identification number of the third sensor arrangement 42, (b) an indication that the third sensor arrangement 42 acquires the torque at the output shaft 34 of the work apparatus 12, (c) the measurement unit of the torque, (d) indications showing how the information of the third sensor arrangement 42 is coded in the data, and (f) indication on the precision of the determined torque.

The control unit 30 is connected via an interface 54 to the data transmission network 36. It comprises a processor unit 64, which comprises or implements a sensor data formatting module 66, a fusion module 68, and a classification module 70 for classifying the fused sensor values. The sensor data fusion module 66 is connected to a sensor knowledge base 72, while the classification module 70 is connected to a rule knowledge base 74. The sensor knowledge base 72, the rule knowledge base 74, and the classification module 70 are also connected to the interface 54. An additional interface 54 connects the data transmission network 36 to a transmitter-receiver 76, by means of which data can be sent via radio waves to remote work machines and/or remote servers, and received by them.

Figure 3:
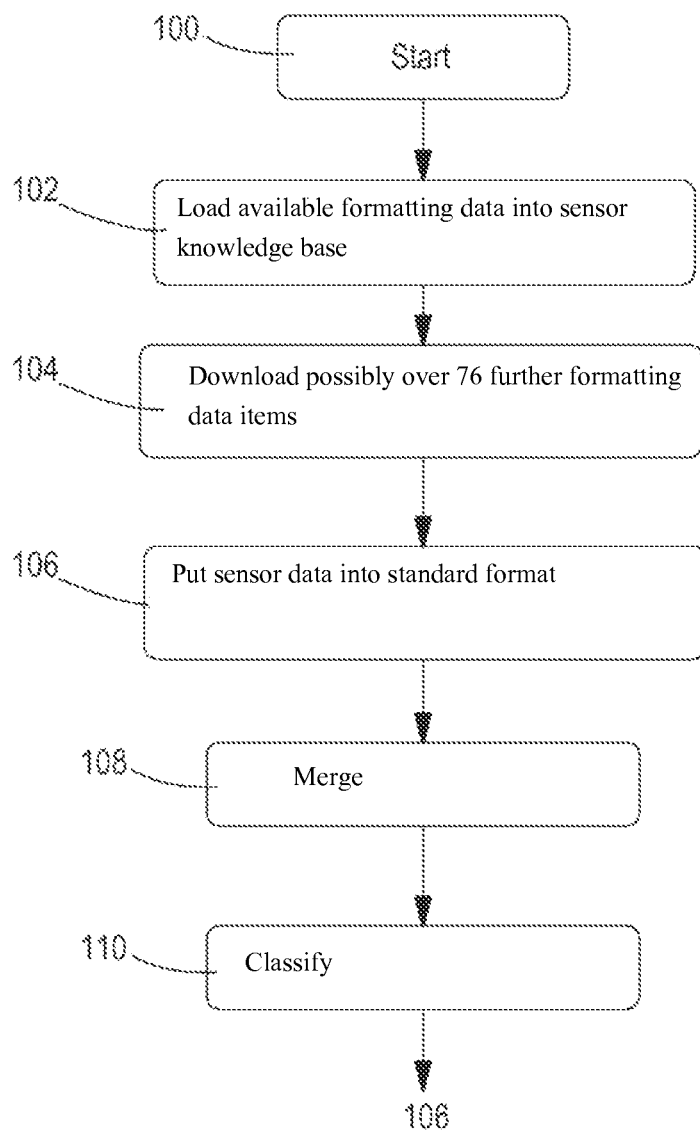
FIG. 3 shows a flow chart showing how the system works to control the work machine.

The flow diagram of FIG. 3 reproduces the operating procedure of the control unit 30 during operation. After the start in step 100 (or after the connection of a new work apparatus 12 to the data transmission network 36), in step 102, all the available formatting data is first downloaded using the identification numbers of the sensor arrangements 38, 40, 42 from the memories 56 of the sensor arrangements 38, 40, 42 via the data transmission network 36 into the sensor knowledge base 72.

If said formatting data is not sufficient to mutually compare and amalgamate the measured value of all three sensor arrangements 38-42, then step 104 takes place, in which, via the transmitter/receiver 76, additional formatting data is downloaded. In the present example of FIGS. 1 and 2, for example, a relation is lacking between the swath cross section and the associated quantity of harvested material, relative to the path distance, which would make it possible to compare the measured values of the sensor arrangement 38 to those of the sensor arrangement 42. Said formatting data can be queried via the transmitter/receiver 76 from a remote server 80 in which such formatting data based on older measured values and/or the previous history of the field in which the work machine happens to be located is stored. Moreover, in order to be able to compare the data of the sensor arrangements 38 and 42, an additional piece of information regarding the ongoing rate of advance of the work machine 10 is required, which is as a rule available in the data transmission network 36. Analogously, there is no relation between torque determined by the sensor arrangement 40 and the throughput of the work apparatus 12, in order to be able to compare the measured values of the sensor arrangements 40 and 42. These formatting data can be queried either via the transmitter/receiver 76 from the server 80, or from another equivalent control device 30 of another work machine that has an equivalent or similar work apparatus where they are stored in the factory, or learned and stored during the course of work processes.

After step 104, sufficient formatting data is available in the sensor knowledge base 72, in order to convert, in step 106, respective current measured values of all the sensor arrangements 38-42 to a standard format. In the present example, all the sensor values can be converted to a throughput (kg of harvested product weight taken up per time unit), on the basis of the formatting data (and optionally current data from the data transmission network, pertaining to the rate of advance of the work machine 10, for example) in the sensor knowledge base 72. Step 106 occurs in the sensor data formatting module 66.

Then, step 108 occurs, in which the sensor data is fused in the fusion module 68. In the process, the respective accuracies of the individual sensor arrangements 38-42 can be taken into consideration, and implausible data can be ignored. Besides the fused sensor value, the fusion module 68 also outputs a precision of this sensor value.

Finally, step 110 occurs, in which the fused sensor data is classified in the classification module 70 with recourse to the rule knowledge base 74. The latter can also receive, via the transmitter/receiver 76, data from other work machines and/or a remote server 80. The classification module 70 uses a fuzzy classification, and the rule knowledge base 74 is used to make available the associated systems of rule of the inference. For this purpose, reference is made to the article by Hoseinnezad et al., mentioned in the introduction, and to the disclosure of EP 1 277 388 A1, which are included by reference in the present documents. In the present example, the system of rules can be based on properties of the harvested material (for example, humidity) and/or the properties of the bale determined by suitable sensors (for example, the bale shape).

In the present example, the classification module 70, in the final analysis, makes available a control parameter that is based on the current throughput of the work apparatus 12, which is used for the control 30 (or by another control of the work machine 10) for controlling an actuator 78 which is controlled via the data transmission network 36 and an interface 54, and which controls the rate of advance of the work machine 10. The classification module 70 can also be replaced by a regulation of any desired type, for example, a PID regulator. Again, step 110 is followed by step 106.

What is claimed is:

1. A system for controlling a work machine, comprising:
   a plurality of sensor arrangements, each of which provides an output value;
   a processor unit; and
   a data transmission network that connects the sensor arrangements to the processor unit, which is configured to convert the output values from the sensor arrangements into a standard data format on the basis of formatting data associated with the sensor arrangements, and to amalgamate the converted output values to form a combined measured value, wherein the processor unit is configured to procure the formatting data via the data transmission network, wherein an identification number is assigned to each sensor arrangement, wherein the processor unit is configured to query the formatting data associated with the sensor arrangements on the basis of the identification number from the data transmission network.

2. The system according to claim 1, wherein at least one of the plurality of sensor arrangements comprises a different type of sensor than at least one other of the plurality of sensor arrangements, and the processor unit is configured to convert the output values from both the at least one of the plurality of sensor arrangements and the at least one other of the plurality of sensor arrangements into a standard data format on the basis of the formatting data associated with the plurality of sensor arrangements.

3. The system according to claim 1, wherein the data transmission network extends over a work machine and optionally a work apparatus connected to said work machine, wherein the formatting data is made available in at least one of memory units connected to the data transmission network or the sensor arrangements.

4. The system according to claim 1, wherein the data transmission network additionally extends over a wireless communication section to a data transmission network of another work machine, which allows the another work machine or any other entity on the network to make available the formatting data in at least one a memory unit connected to the data transmission network, in a sensor arrangement, or in a stationary computer which stores the formatting data.

5. The system according to claim 1, wherein the formatting data comprises at least one of the following data:
- a physical parameter or parameters determined by the sensor arrangement; or
- a measurement unit, a scaling factor, and a zero offset of the measured value; or
- a dependency of the measured value on intrinsic parameters.

6. The system according to claim 5, wherein the formatting data comprises information regarding at least one of a quality metric or a measurement range of the sensor arrangement.

7. The system according to claim 1, wherein the processor unit calculates a combined measured value of an actuator of the work machine or a work apparatus connected to the work machine.

8. The system according to claim 1, wherein the formatting data is either stored in the system at the factory, or is learned during the operation of the work machine.

9. The system according to claim 1, wherein the formatting data is learned during the operation of the work machine.

10. A work machine having a system according to claim 1.

11. A method for controlling a work machine, comprising:
providing output values by a plurality of sensor arrangements;
transmitting the output values via a data transmission network to a processor unit;
converting the output values from several of the plurality of sensor arrangements on the basis of formatting data associated with the several of the plurality of sensor arrangements to a standard data format and amalgamation of the output values that have been converted to a standard data format into the form of a combined measured value, wherein the formatting data is transferred via the data transmission network to the processor unit, and wherein an identification number is assigned to each sensor arrangement; and
querying the formatting data associated with the several of the plurality of sensor arrangements on the basis of the identification number from the data transmission network.

12. The method according to claim 11, wherein at least one of the plurality of sensor arrangements comprises a different type of sensor than at least one other of the plurality of sensor arrangements, and the processor unit is configured to convert the output values from both the at least one of the plurality of sensor arrangements and the at least one other of the plurality of sensor arrangements into a standard data format on the basis of the formatting data associated with the plurality of sensor arrangements.

13. The method according to claim 11, wherein a data transmission network extends over a work machine and optionally a work apparatus connected to said work machine, wherein the formatting data is made available in at least one of memory units connected to the data transmission network or the sensor arrangements.

14. The method according to claim 11, wherein a data transmission network additionally extends over a wireless communication section to a data transmission network of another work machine, and wherein the another work machine or any other entity on the network makes available the formatting data in at least one a memory unit connected to the data transmission network, in a sensor arrangement, or in a stationary computer which stores the formatting data.

15. The method according to claim 11, wherein the formatting data comprises at least one of the following data:
- a physical parameter or parameters determined by the sensor arrangement; or
- a measurement unit, a scaling factor, and a zero offset of the measured value; or
- a dependency of the measured value on intrinsic parameters.

16. The method according to claim 15, wherein the formatting data comprises information regarding at least one of a quality metric or a measurement range of the sensor arrangement.

17. The method according to claim 11, further comprising:
calculating a combined measured value of an actuator of the work machine or a work apparatus connected to the work machine.

18. The method according to claim 11, wherein the formatting data is either stored in the system at the factory, or is learned during the operation of the work machine.

19. The method according to claim 11, wherein the formatting data is learned during the operation of the work machine.

20. The method according to claim 11, wherein information from the plurality of sensor arrangements is provided in the standard data format for static as well as dynamically changing sensor configurations without explicit local prior knowledge of the dynamically changing sensor configurations.

* * * * *